US011691683B2

(12) United States Patent
Hruska et al.

(10) Patent No.: US 11,691,683 B2
(45) Date of Patent: *Jul. 4, 2023

(54) MECHANISM FOR DETECTING MISALIGNMENT IN A CONTINUOUS BELTED MACHINE

(71) Applicant: AGCO Corporation, Duluth, GA (US)

(72) Inventors: Derek D. Hruska, Lime Springs, IA (US); Troy Daniel Schultz, Jackson, MN (US); Alan D. Gustafson, Lakefield, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/757,929

(22) PCT Filed: Sep. 28, 2020

(86) PCT No.: PCT/IB2020/059044
§ 371 (c)(1),
(2) Date: Jun. 23, 2022

(87) PCT Pub. No.: WO2021/130558
PCT Pub. Date: Jul. 1, 2021

(65) Prior Publication Data
US 2023/0020781 A1 Jan. 19, 2023

Related U.S. Application Data

(60) Provisional application No. 62/954,068, filed on Dec. 27, 2019.

(51) Int. Cl.
*B62D 55/15* (2006.01)
*B62D 55/24* (2006.01)
*B62D 55/32* (2006.01)

(52) U.S. Cl.
CPC ............ *B62D 55/15* (2013.01); *B62D 55/24* (2013.01); *B62D 55/32* (2013.01)

(58) Field of Classification Search
CPC ...... B62D 55/15; B62D 55/24; B62D 55/244; B62D 55/32
See application file for complete search history.

(56) References Cited

U.S. PATENT DOCUMENTS

| 5,117,969 A | 6/1992 | Roth |
| 6,386,653 B1 | 5/2002 | Brandenburger |

(Continued)

FOREIGN PATENT DOCUMENTS

| GB | 2360501 A | 9/2001 |
| WO | 2016/130640 A1 | 8/2016 |

OTHER PUBLICATIONS

UK Intellectual Property Office, Search Report for related UK Application No. 2000182.2, dated Jun. 22, 2020.

(Continued)

*Primary Examiner* — Kip T Kotter

(57) ABSTRACT

A track roller assembly for a work machine including a track roller frame with drive and idler wheels and an endless track disposed about the wheels, mid-rollers located between the drive and idler wheels, each mid-roller having a shaft mounted on a bogie frame and a pair of mid-roller hubs having roller wheels mounted on the shaft, one mid-roller hub and wheel on either side of the bogie frame, each mid-roller hub having a guide facing guide blocks, an alignment sensing mechanism to detect misalignment of the track, where the alignment sensing mechanism includes at least one sensor paddle mounted on the bogie frame such that a lobe of the sensor paddle resides adjacent the guide blocks such that sideways movement of the endless track (Continued)

belt causes the guide blocks to contact the sensor paddle before contacting the mid-rollers.

10 Claims, 7 Drawing Sheets

(56) References Cited

U.S. PATENT DOCUMENTS

| | | | |
|---|---|---|---|
| 2016/0121945 A1 | 5/2016 | Caterpillar | |
| 2017/0177011 A1* | 6/2017 | Garvin | B62D 55/244 |
| 2018/0190045 A1* | 7/2018 | Richard | B62D 55/14 |
| 2018/0265145 A1* | 9/2018 | Todd | B60K 31/00 |
| 2018/0364744 A1 | 12/2018 | Garvin et al. | |
| 2019/0118879 A1 | 4/2019 | Agco | |
| 2021/0088416 A1* | 3/2021 | Grenzi | B62D 55/32 |
| 2021/0173399 A1* | 6/2021 | Richard | B60W 40/12 |

OTHER PUBLICATIONS

European Patent Office, International Search Report for International Patent Application No. PCT/IB2020/059044, dated Dec. 4, 2020.

* cited by examiner

MECHANISM FOR DETECTING MISALIGNMENT IN A CONTINUOUS BELTED MACHINE

CROSS REFERENCE TO RELATED APPLICATION

This application claims the benefit of U.S. Provisional Application No. 62/954,068, filed Dec. 27, 2019, which is hereby incorporated by reference in its entirety.

BACKGROUND OF THE INVENTION

Field of Invention

This invention relates generally to continuous belted work machines and more particularly to a mechanism for detecting misalignment of the tracks on a continuous belted machine.

Description of Related Art

A typical rubber-tracked work machine utilizes a propulsion system in which a continuous flexible rubber belt or track is frictionally driven as it is entrained about drive and idler wheels. The work machines are configured to maintain adequate tension on the endless belt around the entrained wheels, and to keep the belt in lateral alignment with the wheels when the wheels are subject to large lateral loads. Tracked work machines utilize multiple mid-roller wheels to distribute the vehicle's weight within the track and to help constrain the track from sliding off the wheels laterally.

Providing and maintaining the alignment of the drive wheel with respect to the idler and mid-roller wheels and the track is difficult due to manufacturing tolerances, uneven wear, and damage to suspension components. Proper alignment increases the life of the track and reduces unwanted friction between the track and the undercarriage. Typically, when the idler and mid-roller wheels are misaligned with respect to the drive wheel, the track will not remain centered over each wheel as they rotate, but will migrate toward one side of the wheels over time. In the event the track is equipped with guide blocks or lugs (usually on its inner surface) to prevent such track migration, the migratory forces will force these blocks lugs against the wheels that receive the guide blocks and guide the track. This will cause the guide blocks to rapidly wear away.

There is a need, therefore, for an improved system for determining when an out of alignment condition exists with the track and the correct direction of adjustment needed to obtain proper alignment.

Overview of the Invention

In one embodiment, the invention is directed to a tracked work machine having a track roller assembly. The track roller assembly includes a track roller frame having a bogie frame pivotally attached thereon, a drive wheel and an idler wheel mounted on the track roller frame, and an endless track belt disposed about the drive and idler wheels. The endless track belt has a plurality of track guide blocks positioned on an inner surface and centrally located between a pair of track edges. A plurality of supporting mid-rollers are located between the drive wheel and the idler wheel and configured to engage the plurality of guide blocks to aid in maintaining alignment of the endless track belt. Each of the plurality of mid-rollers has a cylindrical shaft mounted on the bogie frame and a pair of mid-roller hubs having a roller wheels attached thereon mounted on the shaft, with one mid-roller hub and wheel on either side of the bogie frame. Each mid-roller hub has a guide facing the plurality of track guide blocks. The track roller assembly has an alignment sensing mechanism positioned adjacent the endless track belt configured to detect a misalignment condition of the endless track belt. The alignment sensing mechanism includes at least one sensor paddle mounted on the bogie frame adjacent to the mid-roller shaft such that a lower lobe of the sensor paddle resides adjacent the guide blocks of the endless track belt such that sideways movement of the endless track belt causes the guide blocks to contact the sensor paddle before the guide blocks contact the guide on any of the plurality of mid-rollers.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
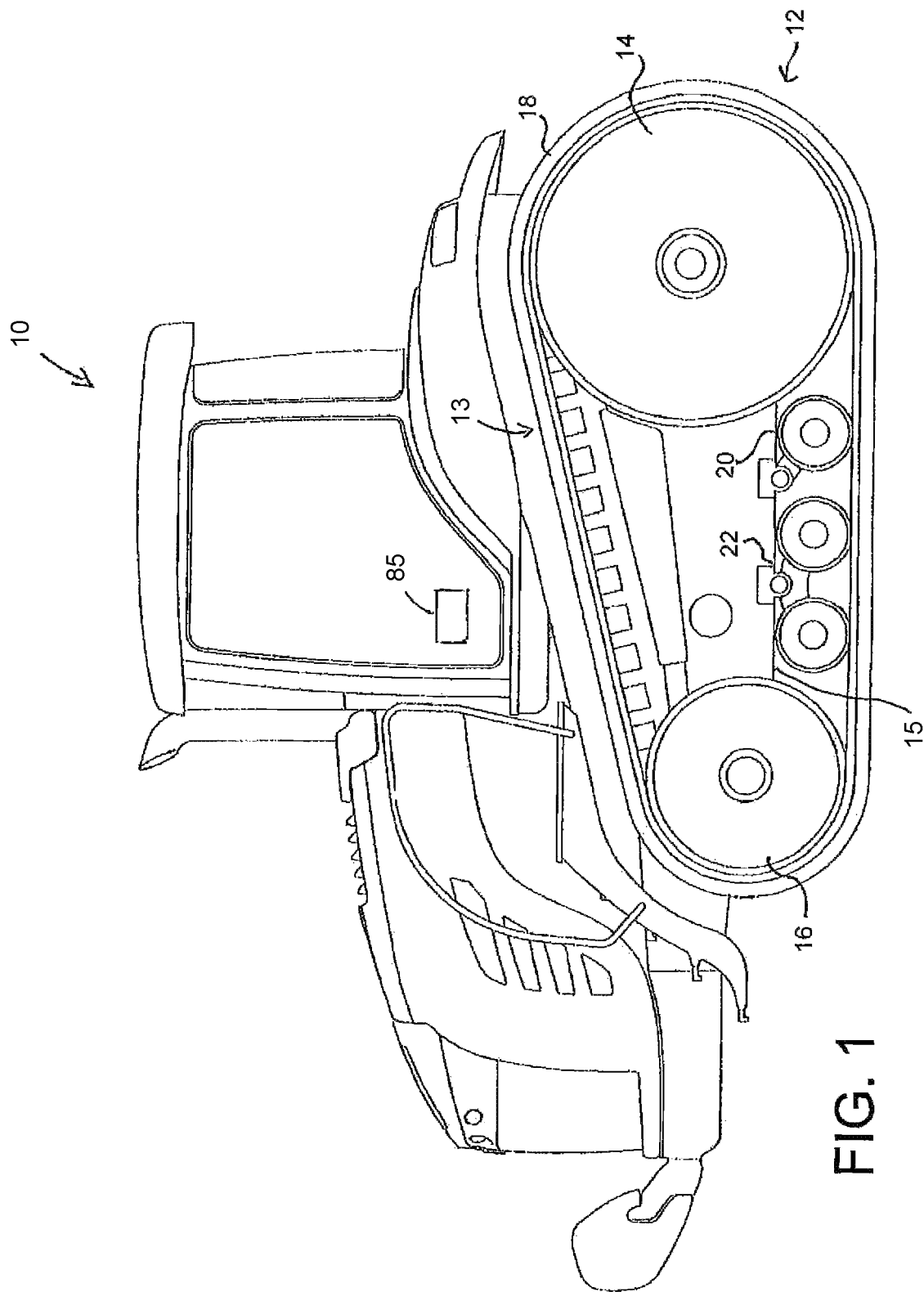
FIG. 1 is a side elevational view of a work machine embodying the present invention.

Referring initially to FIG. 1, a work machine 10 has an undercarriage assembly 12 having a pair of track roller assemblies 13, only one shown, configured to drive the work machine 10 over ground. Each track roller assembly 13 includes a drive wheel 14 mounted on a track roller frame 15 and an idler wheel 16 with an endless track belt 18 disposed about the drive and idler wheels 14, 16. In as much as the track roller assemblies 12 are substantially structurally and operatively similar, further reference will be made to only a single side of the work machine 10. In this example, an engine (not shown) powers the drive wheel 14, in a conventional manner, and frictionally drives each of the endless track belts 18. Located between the drive wheel 14 and the idler wheel 16 is a plurality of supporting mid-rollers 20. The mid-rollers 20 are attached to a bogie frame 22 pivotally attached to the track roller frame 15 in any manner known in the art. The work machine 10, for example, is an agricultural tractor positioning the drive wheel 14 near the back and the idler wheel 16 toward the front of the work machine 10.

Figure 2:
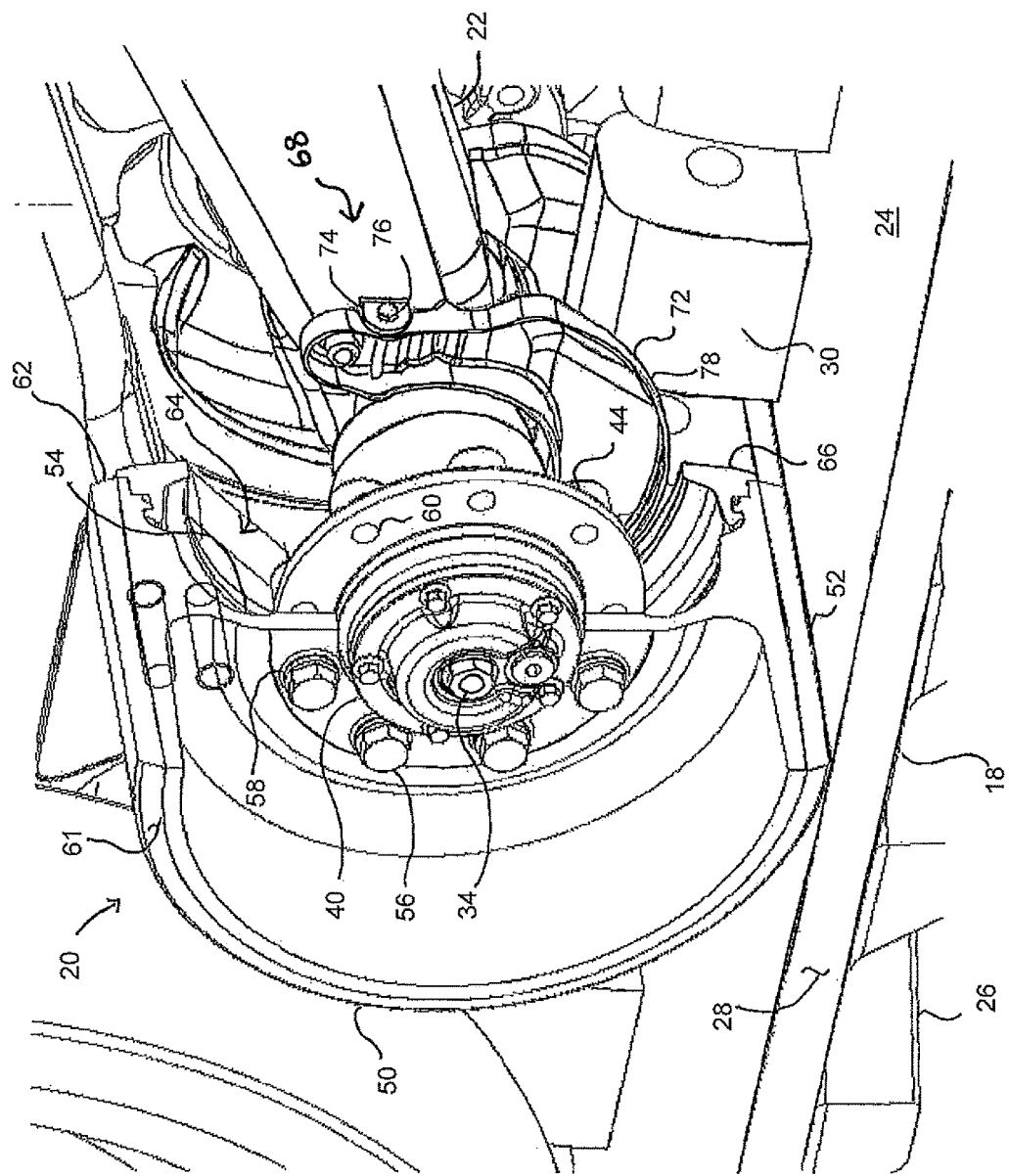
FIG. 2 is a partially cut away perspective view of a portion of the undercarriage and track of the work machine of FIG. 1.

Referring now to FIG. 2, the endless track belt 18 defines an inner surface 24, a ground contacting or outer surface 26, and a pair of edges 28. Positioned on the inner surface 24 and centrally located between the pair of edges 28 is a plurality of guide blocks 30.

Each mid-roller 20 includes a cylindrical shaft 34 mounted on the bogie frame 22. A pair of mid-roller hubs 40 are mounted on the shaft 34, with one hub 40 on either side of the bogie frame 22. Each hub 40 includes a radial flange portion 44. A roller wheel 50 is attached to the flange portion 44 of each hub 40. While the mid-roller 20 includes an inner and outer hub 40 and wheel 50, they are substantially mirror images of each other and only the outer hub 40 and wheel 50 will be described herein. Each roller wheel 50 has a cylindrical track-engaging barrel 52 and a radial center disc 54. A plurality of fasteners 56 connects the respective roller wheel 50 using the holes 58 in the center disc 54 and holes 60 in the flange portion 44 of the hub 40. In the illustrated embodiment, the barrel 52 has an outer lip 61 on the side of the barrel 52 furthest away from the bogie frame 22 and an inner lip 62 on the side of the barrel 52 closest to the bogie frame 22. An inner wheel recess 64 is swept out in an area between the center disc 54 and the inner lip 62 of the barrel 50.

A ring-like, reduced-friction guide 66 may be mounted to the portion of the roller wheel 50 interacting with the track guide blocks 30. The reduced-friction guide 66 may be pressed into the inner lip 62 of the roller wheel 50. The reduced-friction guide 66 is configured to be the point of contact between the mid-roller 20 and the track guide blocks 30 during high speed roading and field operation on slopes, which result in significant rubbing of the mid-roller 20 with the track guide blocks 30.

Figure 3:
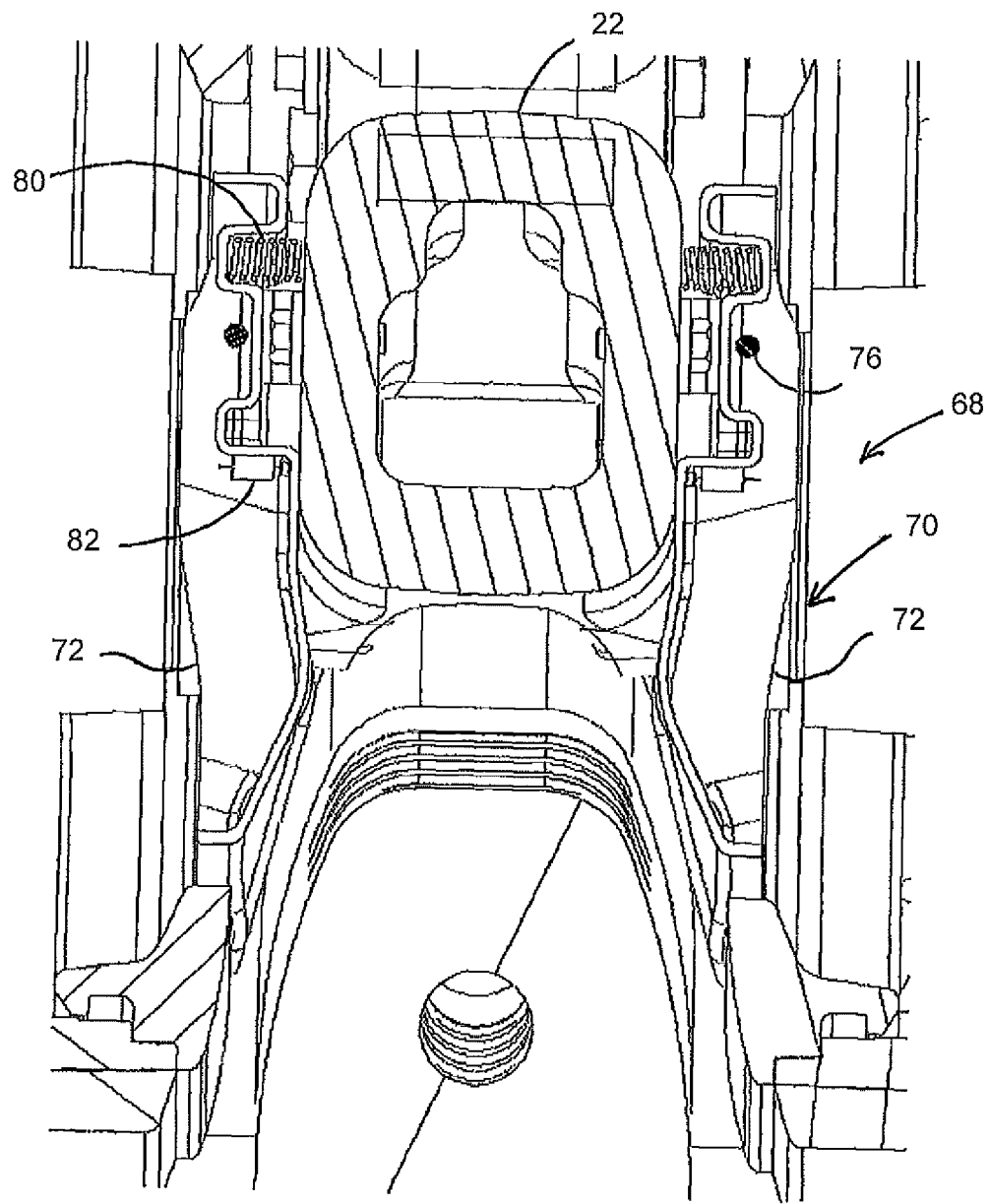
FIG. 3 is a sectional view of a portion of the undercarriage and track of the work machine of FIG. 1.
Figure 4:
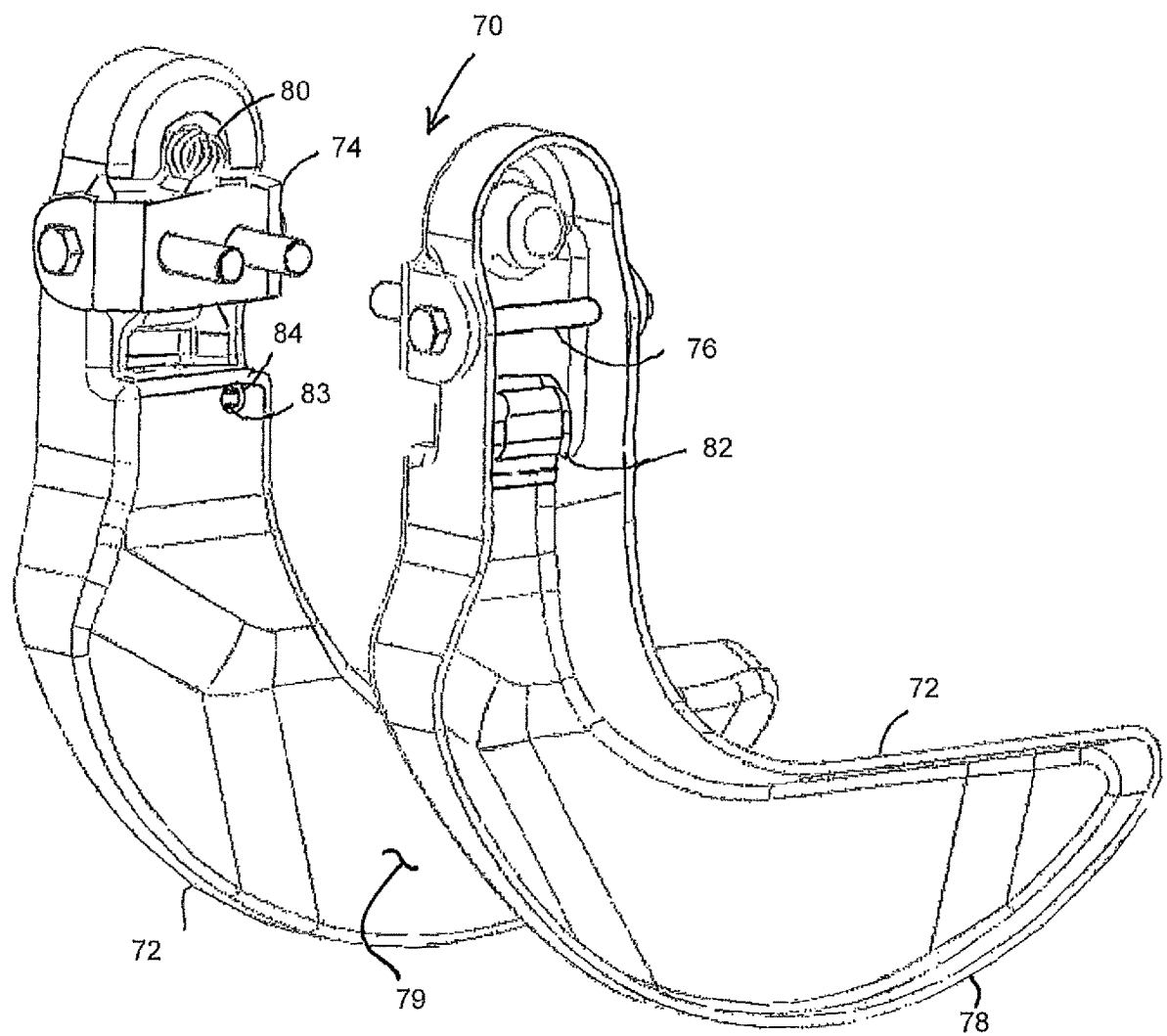
FIG. 4 is a perspective view of an embodiment of sensor paddles that are part of an alignment sensing mechanism for the undercarriage and track of the work machine of FIG. 1.

Turning also now to FIG. 3, according to the invention an alignment system 68 of the work vehicle 10 has an alignment sensing mechanism 70 that positioned adjacent the endless track belt 18 and configured to detect misalignment of the endless track belt 18. In one embodiment, the alignment sensing mechanism 70 comprises a sensor paddle 72 mounted on the bogie frame 22 in close proximity to the mid-roller shaft 36. The sensor paddle 72 is mounted with a bracket 74 on the bogie frame 22 and a pivot pin 76 that allows pivoting movement of the sensor paddle 72 about the pivot pin 76. A lower lobe 78 of the sensor paddle 72 resides adjacent the guide blocks 30 of the endless track belt 18. Desirably, a biasing spring 80 biases the sensor paddle 72 into a neutral position such that an inner surface 79 of the lobe 78 is positioned slightly closer to the guide block 30 relative the reduced-friction guide 66 of the mid-roller 20. Thus, sideways movement of the endless track belt 18 causes the guide blocks 30 to contact the sensor paddle 72 slightly before the guide blocks 30 contact the mid-roller 20. The sensor paddle 72 has sensor 82 that detects if the sensor paddle 72 has moved away from its neutral position. The sensor 82 may be an electrical sensor, a limit switch, or other known sensor configured to detect movement in the position of the sensor paddle 72. As best seen in FIG. 4, in the illustrated embodiment, the sensor 82 has a contact 83 that projects through an opening 84 in the sensor paddle 72 used to detect the proximity of the sensor 82 to the bogie frame 22. The alignment sensing mechanism 70 has a first sensor paddle 72 adjacent the roller wheel 50 on the outside side of the bogie frame 22 and a second sensor paddle 72 adjacent the roller wheel 50 on the inside side of the bogie frame 22 so that the alignment sensing mechanism 70 can detect lateral movement of the endless track belt 18 in both directions.

Sideways movement of the endless track belt 18 causes the guide blocks 30 to contact the sensor paddle 72 and pivot the sensor paddle 72 from its neutral position to a misaligned position. In the misaligned position, the position of the contact 83 of the sensor 82 moves thereby causing the sensor 82 to detect the misaligned position. If the endless track belt 18 returns to an aligned condition such that the guide block 30 no longer contacts the lobe 78 of the sensor paddle 72, the return spring 80 moves the sensor paddle 72 back to its neutral position. When the sensor paddle 72 is moved to the misaligned position, the sensor 82 detects the movement and sends a signal to a controller 85 on the work machine 10. And adjustment component 86 of the alignment system 68 may then be used adjust the alignment of the endless track belt 18.

In one embodiment of operation of the alignment system 68, software in the controller 85 receives sensor input from one or more of the sensors 82. The sensor input may comprise a voltage or current signal (e.g., digital or analog) comprising or associated with information, such as a parameter corresponding to motion of the sensor paddle 72. The controller 85 determines, based on the inputs from the sensors 82, if the sideways movement of the endless track belt 18 is a momentary movement caused by ground conditions of the field over which the work vehicle 10 is traveling, or if the endless track belt 18 movement is caused by a misalignment condition. In some embodiments, the controller 85 may collect data (e.g., with parameter values received from the sensors 82) over a predetermined window of time or distance traveled, enabling computation of a statistical value for track misalignment (e.g., average, mean, etc.) experienced by the endless track belt 18, which in turn enables an adjustment value to be determined based on the statistical motion value. The controller 85 issues a control signal with the adjustment value to the adjustment component 86 of the undercarriage assembly 12 based on the moving average to change the alignment of the endless track belt 18.

Figure 5A:
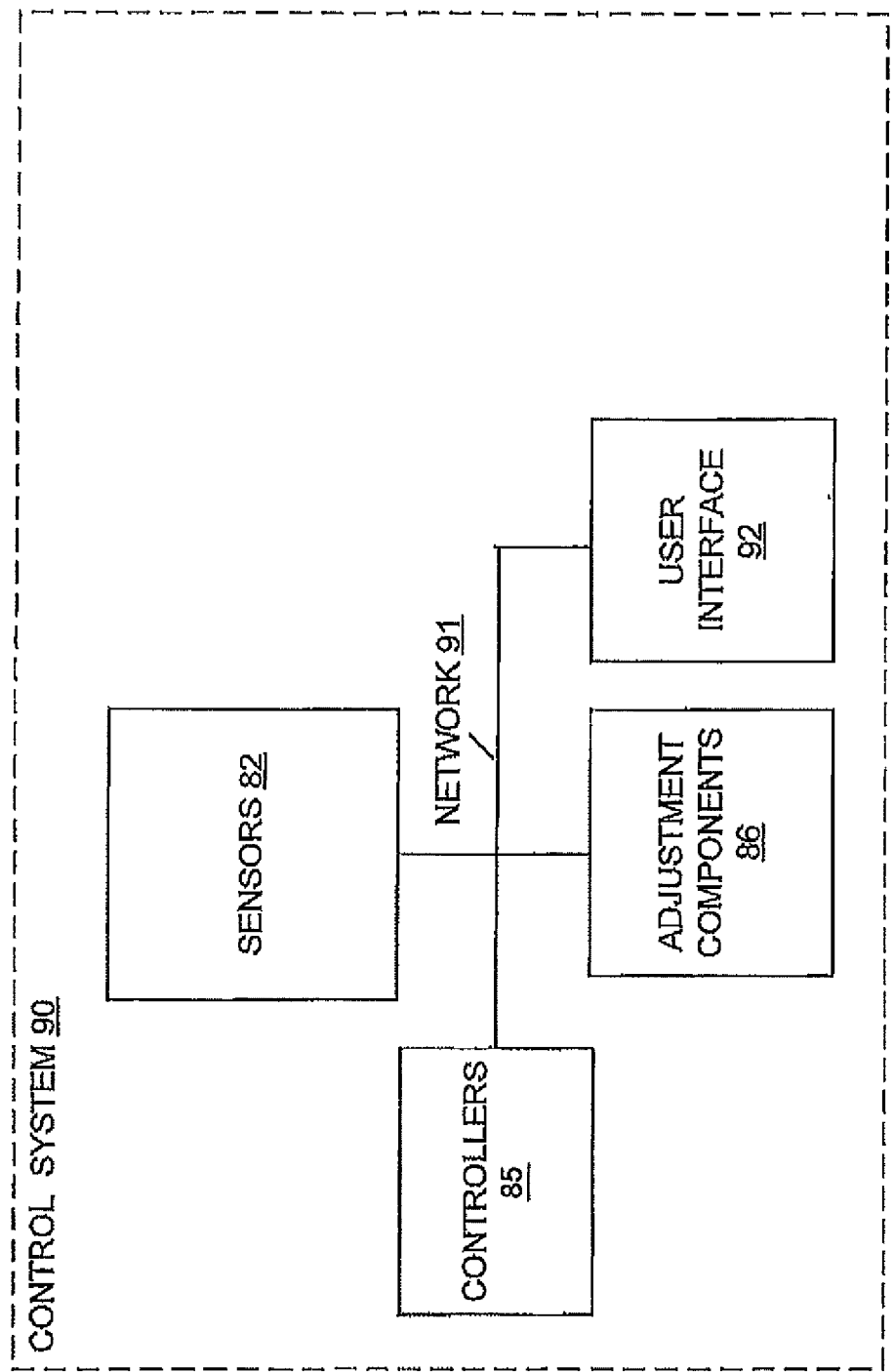
FIG. 5A is a block diagram of an embodiment of an example control system.

Having described an embodiment of an example work vehicle 10 having an alignment detection mechanism 70, attention is directed to FIG. 5A, which illustrates an embodiment of an example control system 90 used for providing control and management of the alignment system 68. It should be appreciated within the context of the present disclosure that some embodiments may include additional components or fewer or different components, and that the example depicted in FIG. 5A is merely illustrative of one embodiment among others. Further, though depicted as residing entirely within the work vehicle 10, in some embodiments, the control system 90 may be distributed among several locations. For instance, the functionality of the controller 85 may reside all or at least partly at a remote computing device, such as a server that is coupled to the control system components over one or more wireless networks (e.g., in wireless communication with the work vehicle 10 via a radio frequency (RF) and/or cellular modems residing in the work vehicle 10). Further, though depicted using a single controller 85, in some embodiments, the control system 90 may be comprised of plural controllers. In the depicted embodiment, the controller 85 is coupled via one or more networks, such as network 91 (e.g., a CAN network or other network, such as a network in conformance to the ISO 11783 standard, also referred to as "Isobus"), to the one or more sensors 82, one or more adjustment components 86, and user interface 92. The sensors 82 may be embodied as contact (e.g., electromechanical sensors, such as position sensors, strain gauges, pressure sensors, etc.) and non-contact type sensors (e.g., photo-electric, inductive, capacitive, ultrasonic, etc.), all of which comprise known technology. The user interface 92 may include one or any combination of a keyboard, mouse, microphone, touch-type or non-touch-type display device, joystick, steering wheel, lever, and/or other devices (e.g., switches, immersive head set, etc.) that enable input and/or output by an operator. The control system 90 may include one or more additional components, such as a wireless network interface module (e.g., including an RF or cellular modem) for wireless communication among other devices of the work vehicle 10 or other communication devices located remote and/or external from the work vehicle 10. The wireless network interface module may working conjunction with communication software (e.g., including browser software) in the controller 85, or as part of another controller coupled to the network and dedicated as a gateway for wireless communications to and from the network. The wireless network interface module may comprise MAC and PHY components (e.g., radio circuitry, including transceivers, antennas, etc.), as should be appreciated by one having ordinary skill in the art.

In one embodiment, the controller 85 is configured to receive and process information (e.g., one or more parameters) from the sensors 82 and communicate instructions (e.g., adjustment values) to the adjustment component 86 based on the input of information from the sensors 82 and the user interface 92. In some embodiments, the controller 85 may provide feedback of any automatic adjustment in alignment settings to the operator via the user interface 92.

Figure 5B:
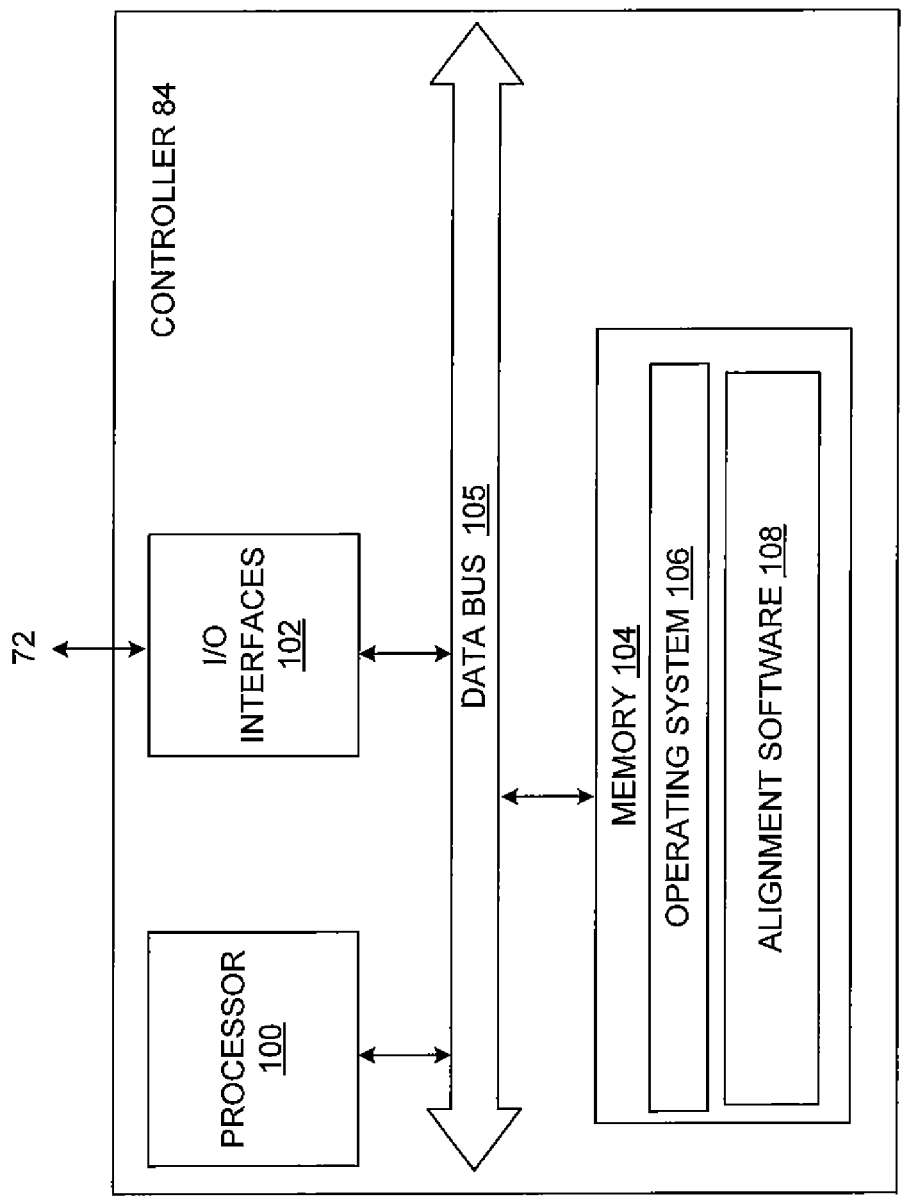
FIG. 5B is a block diagram of an embodiment of an example controller used in the control system of FIG. 5A.

FIG. 5B further illustrates an example embodiment of the controller 85. One having ordinary skill in the art should appreciate in the context of the present disclosure that the example controller 85 is merely illustrative, and that some embodiments of controllers may comprise fewer or additional components, and/or some of the functionality associated with the various components depicted in FIG. 5B may be combined, or further distributed among additional modules, in some embodiments. It should be appreciated that, though described in the context of residing in the work vehicle 10 (FIG. 1), in some embodiments, the controller 85, or all or a portion of its corresponding functionality, may be implemented in a computing device or system located external to the work vehicle 10. Referring to FIG. 5B, with continued reference to FIG. 5A, the controller 85 or electronic control unit (ECU) is depicted in this example as a computer, but may be embodied as a programmable logic controller (PLC), field programmable gate array (FPGA), application specific integrated circuit (ASIC), among other devices. It should be appreciated that certain well-known components of computers are omitted here to avoid obfuscating relevant features of the controller 85. In one embodiment, the controller 85 comprises one or more processors (also referred to herein as processor units or processing units), such as processor 100, input/output (I/O) interface(s) 102, and memory 104, all coupled to one or more data busses, such as data bus 105. The memory 104 may include any one or a combination of volatile memory elements (random-access memory RAM, such as DRAM, and SRAM, etc.) and nonvolatile memory elements (e.g., ROM, Flash, hard drive, EPROM, EEPROM, CDROM, etc.). The memory 104 may store a native operating system, one or more native applications, emulation systems, or emulated applications for any of a variety of operating systems and/or emulated hardware platforms, emulated operating systems, etc.

In the embodiment depicted in FIG. 5B, the memory 104 comprises an operating system 106 and alignment software 108. It should be appreciated that in some embodiments, additional or fewer software modules (e.g., combined functionality) may be deployed in the memory 102 or additional memory. In some embodiments, a separate storage device may be coupled to the data bus 85, such as a persistent memory (e.g., optical, magnetic, and/or semiconductor memory and associated drives).

The alignment software 108 receives sensor input from one or more sensors 82 and input from the adjustment system 88. The alignment software 108 processes the plural inputs to derive an adjustment value or values to communicate to the adjustment components 86. The alignment software 108 may compare the values received from the sensor input in a look up table (e.g., stored in memory 104) that associates the parameters to a respective adjustment value. In some embodiments, the parameters are used in a formula that the alignment software 108 computes to derive an adjustment value. The adjustment value may be based on a moving average (or other statistical values) of prior sensor input (with the window of the moving average defined by a predetermined time and/or distance traveled by the work vehicle 10, FIG. 1), or continually updated in finer increments of time (e.g., as sensor input is received) in some embodiments. Further, in some embodiments, adjustment values may be continuously variable values or rounded up or down (or interpolated) to fixed incremental values in some embodiments. The alignment software 108 communicates the adjustment value via the I/O interfaces 102 to the adjustment components 86, which are used to cause an adjustment to the alignment of the endless track belt 18.

Execution of the alignment software 108 may be implemented by the processor 100 under the management and/or control of the operating system 106. The processor 100 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 85.

When certain embodiments of the controller 85 are implemented at least in part with software (including firmware), as depicted in FIG. 5B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 85 are implemented at least in part with hardware, such functionality may be implemented with any or a combination of the following technologies, which are all well-known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
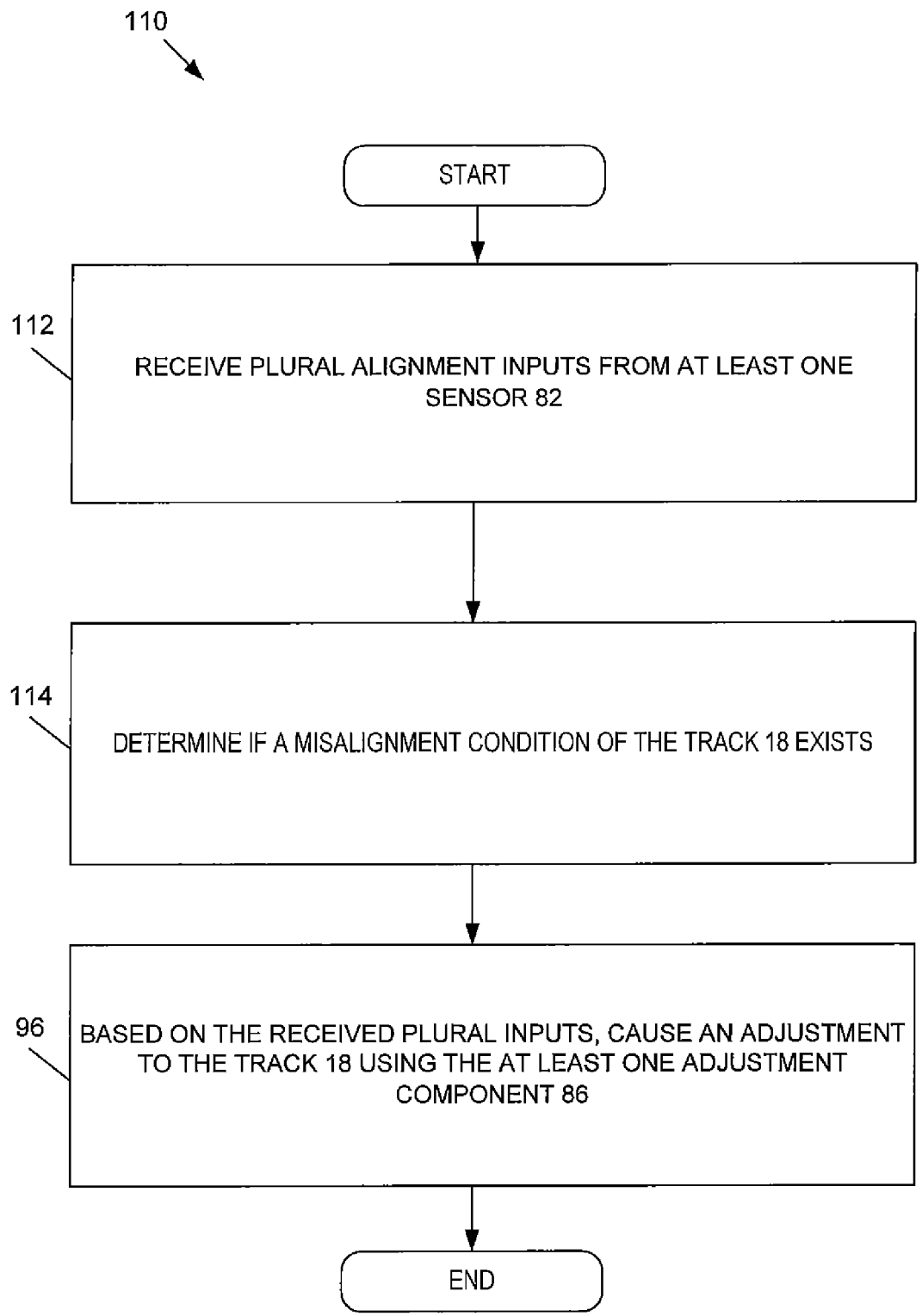
FIG. 6 is a flow diagram that illustrates an embodiment of an example misalignment detection method.

In view of the above description, it should be appreciated that one embodiment of a track alignment method 110, depicted in FIG. 6 (and implemented in one embodiment by the alignment software 108, FIG. 5B), comprises receiving plural inputs from at least one sensor 82 at step 112; determining if a misalignment condition of the endless track belt 18 exists at step 114, and based on the received plural inputs, causing an adjustment to the alignment of the endless track belt 18 by the at least one adjustment component 86 at step 116.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A tracked work machine having a track roller assembly comprising:
a track roller frame having a bogie frame pivotally attached thereon;
a drive wheel mounted on the track roller frame;
an idler wheel mounted on the track roller frame;
an endless track belt disposed about the drive and idler wheels, the endless track belt defining an inner surface, a ground-contacting outer surface, and a pair of edges, wherein the endless track belt comprises a plurality of track guide blocks positioned on the inner surface and centrally located between the pair of edges;
a plurality of supporting mid-rollers located between the drive wheel and the idler wheel and configured to engage the plurality of guide blocks to aid in maintaining alignment of the endless track belt, each of the plurality of mid-rollers comprising a cylindrical shaft mounted on the bogie frame and a pair of mid-roller hubs having respective roller wheels attached thereon mounted on the shaft, with one mid-roller hub and wheel on either side of the bogie frame, wherein each mid-roller hub has a guide facing the plurality of track guide blocks; and
an alignment sensing mechanism positioned adjacent the endless track belt configured to detect a misalignment condition of the endless track belt, the alignment sensing mechanism comprising at least one sensor paddle mounted on the bogie frame adjacent to the mid-roller shaft such that a lower lobe of the sensor paddle resides adjacent the guide blocks of the endless track belt such that sideways movement of the endless track belt causes the guide blocks to contact the sensor paddle before the guide blocks contact the guide on any of the plurality of mid-rollers.

2. The tracked work machine of claim 1 wherein the at least one sensor paddle is mounted on the bogie frame with a bracket and a pivot pin that allows pivoting movement of the sensor paddle about the pivot pin.

3. The tracked work machine of claim 1 wherein further comprising a biasing spring that biases the sensor paddle into a neutral position such that an inner surface of the lobe is positioned slightly closer to the guide block relative to the mid-roller.

4. The tracked work machine of claim 3 wherein the sensor paddle comprises a sensor that detects when the sensor paddle has moved away from the neutral position.

5. The tracked work machine of claim 4 wherein the sensor is an electrical sensor configured to detect movement in the position of the sensor paddle.

6. The tracked work machine of claim 4 wherein the sensor has a contact that projects through an opening in the sensor paddle used to detect the proximity of the sensor to the bogie frame.

7. The tracked work machine of claim 4 wherein sideways movement of the endless track belt causes the guide blocks to contact the sensor paddle and pivot the sensor paddle from the neutral position to a misaligned position, and in the misaligned position the position of a contact on the sensor moves, thereby causing the sensor to detect the misaligned position.

8. The tracked work machine of claim 3 wherein when the endless track belt returns to an aligned condition such that the guide block no longer contacts the lobe of the sensor paddle, the biasing spring moves the sensor paddle back to the neutral position.

9. The tracked work machine of claim 1 further comprising a controller, wherein when the sensor paddle is moved to a misaligned position, the sensor detects the movement and sends a signal to the controller.

10. The tracked work machine of claim 1 wherein the at least one sensor paddle of the alignment sensing mechanism comprises a first sensor paddle adjacent the roller wheel on an outside side of the bogie frame and a second sensor paddle adjacent the roller wheel on an inside side of the bogie frame so that the alignment sensing mechanism can detect lateral movement of the endless track belt in both directions.

* * * * *